(12) United States Patent
Brooks

(10) Patent No.: US 6,182,526 B1
(45) Date of Patent: Feb. 6, 2001

(54) VEHICLE CONTROL PEDALS

(75) Inventor: Neil Arthur Brooks, Birmingham (GB)

(73) Assignee: Rover Group Limited, Warwick (GB)

( * ) Notice: Under 35 U.S.C. 154(b), the term of this patent shall be extended for 0 days.

(21) Appl. No.: 09/379,292

(22) Filed: Aug. 23, 1999

(30) Foreign Application Priority Data

Sep. 5, 1998 (GB) .................................................. 9819308

(51) Int. Cl.[7] .............................. B60R 21/09; B60T 7/06
(52) U.S. Cl. ............................................................ 74/512
(58) Field of Search .......................... 74/512, 513, 560; 180/274, 275

(56) References Cited

U.S. PATENT DOCUMENTS

| | | |
|---|---|---|
| 5,531,135 | 7/1996 | Dolla . |
| 6,089,342 * | 7/2000 | Muller et al. ..................... 180/274 |

FOREIGN PATENT DOCUMENTS

| | | |
|---|---|---|
| 43 35 511 A1 * | 5/1994 | (DE) . |
| 0 805 079 A2 | 11/1997 | (EP) . |
| 0805079 A2 | 11/1997 | (EP) . |
| 0 847 900 A1 | 6/1998 | (EP) . |
| 0 893 310 A1 | 1/1999 | (EP) . |
| 98/49030 | 11/1998 | (WO) . |

* cited by examiner

*Primary Examiner*—Dirk Wright
(74) *Attorney, Agent, or Firm*—Davis and Bujold

(57) ABSTRACT

A vehicle brake pedal has a deflecting block projecting from its front surface which is arranged, if the pedal is moved backwards in the event of a frontal impact, to contact a steering column bracket before the top end of the pedal, thereby depressing the pedal and retracting it away from the driver.

15 Claims, 4 Drawing Sheets

VEHICLE CONTROL PEDALS

FIELD OF THE INVENTION

The present invention relates to vehicle control pedals, and is particularly useful in connection with vehicle brake pedals.

BACKGROUND OF THE INVENTION

It is desirable that, when a vehicle is involved in a frontal impact, the control pedals, and particularly the brake pedal, do not move rearwards too far into the passenger compartment. Various mechanisms have been devised to ensure that, on frontal impact, the brake pedal is retracted away from the driver. For example it is known from WO 98/49030 to provide a link pivotably mounted at one end on the vehicle body to the rear of the pedal and having the other end connected to the pedal so that it can slide and pivot relative to the pedal. However, this arrangement is somewhat complex in view of pivoting and sliding connections, which must be able to withstand movement with every operation of the pedal whilst not interfering with that operation.

SUMMARY OF THE INVENTION

Accordingly the present invention provides a vehicle comprising a driver operated foot pedal pivotably supported at its upper end on mounting member by means of a pivot and having a lower end adapted to be acted on by a driver's foot, and a solid member positioned to the rear of the mounting member towards which the mounting member will tend to move on deformation of the vehicle on a frontal impact, wherein the pedal includes a deflecting means rigidly fixed relative to said lower end, and projecting rearwards from the rear side of the pedal below the pivot such that, if the mounting member is moved rearwards in the event of a frontal impact, the solid member will act on the deflecting means to causing at least partial depression of the pedal.

Preferably the deflecting means is, when the pedal is in a fully released position, spaced from the solid member so that it will only start to deflect the pedal after a certain amount of rearward movement of the mounting member.

Preferably the deflecting means has a deflecting surface on its rear side arranged such that, if the top of the pedal in the region of the pivot engages the solid member, the pedal will be depressed by an amount approximately equal to its full travel in normal use.

Preferably the deflecting means is deformable so that it can apply a load to the pedal which increases as the mounting member moves rearwards towards the solid member.

Preferably the deflecting means is arranged so that the load it applies to the pedal is arranged to increase to a maximum level and then to remain substantially constant or decrease as the mounting member moves towards the solid member. The maximum level is desirably that which is required to fully depress the pedal, and may be of the order of 3 kN.

The solid member can conveniently comprise part of a steering column assembly.

The present invention further provides a vehicle comprising a driver operated brake pedal having an upper end and a lower end adapted to be acted on by a driver's foot and a rear side facing rearwards of the vehicle, a mounting bracket, a pivot pivotably supporting said upper end on the mounting bracket, and a solid member positioned to the rear of the mounting bracket towards which the mounting bracket will tend to move on deformation of the vehicle on a frontal impact, wherein the pedal includes a deflecting block rigidly fixed relative to said lower end, and projecting rearwards from the rear side of the pedal below the pivot such that, if the mounting bracket is moved rearwards in the event of a frontal impact, the solid member will act on the deflecting block to causing at least partial depression of the pedal.

The present invention still further provides a vehicle comprising a driver operated brake pedal having an upper end and a lower end adapted to be acted on by a driver's foot and a rear side facing rearwards of the vehicle, a mounting bracket, a pivot pivotably supporting said upper end on the mounting bracket, and a solid member positioned to the rear of the mounting bracket towards which the mounting bracket will tend to move on deformation of the vehicle on a frontal impact, wherein the pedal includes a deflecting bracket rigidly fixed relative to said lower end, and projecting rearwards from the rear side of the pedal below the pivot such that, if the mounting bracket is moved rearwards in the event of a frontal impact, the solid member will act on the deflecting bracket to causing at least partial depression of the pedal.

Preferred embodiments of the present invention will now be described by way of example only with reference to the accompanying drawings

DESCRIPTION OF THE PREFERRED EMBODIMENTS

Figure 1:
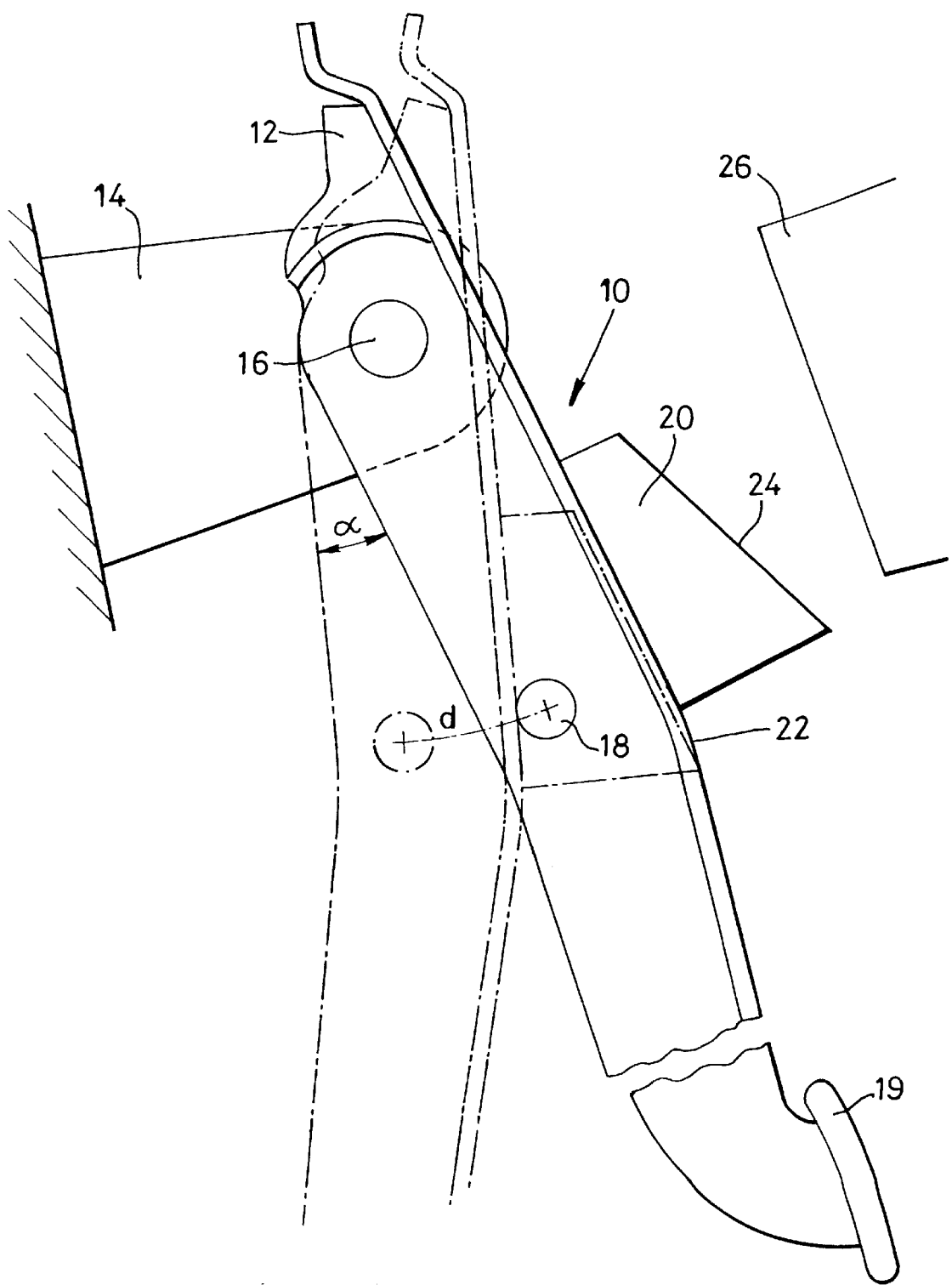
FIG. 1 is a side view of a brake pedal forming part of a vehicle according to a first embodiment the invention under normal operation.

Referring to FIG. 1, according to a first embodiment of the invention, a vehicle includes a brake pedal 10 mounted towards its upper end 12 on a mounting bracket 14 by means of a mounting pivot 16. The mounting bracket 14 is supported on the dash panel or fire wall at the front of the passenger compartment. The pedal 10 includes a push-rod pivot 18, spaced from the mounting pivot 16, which is arranged to have one end of a push-rod connected to it so that rotation of the pedal 10 about the mounting pivot 16 causes movement of the push-rod and therefore actuation of the braking system. A foot pad 19 is provided at the lower end of the pedal to allow operation of the pedal by a driver. The pedal is shown in its fully released position in bold lines, and is held in that position by a return spring. Its range of travel in the forward direction when depressed by the driver extends to its fully depressed position which is shown in dotted lines. This range of travel covers an angle of rotation α about the pivot 16 and moves the push-rod pivot 18 forwards by a distance d.

A deflecting member in the form of a block 20 is mounted on the rear side 22 of the pedal 10 and projects from it in the rearward direction, i.e. towards the driver. Its rear face 24 is at an angle to the rear side 22 of the pedal, lying in a plane which passes through the top end 12 of the pedal. The deflecting block 20 is level with the push-rod pivot 18, being spaced from the top end 12 of the pedal.

The vehicle also includes a steering column mounting bracket 26 for supporting the vehicle steering column, the bracket 26 being positioned to the rear of the brake pedal approximately level with the pedal mounting pivot 16 and the upper end 12 of the pedal. Normally there is a relatively large gap between the steering column mounting bracket 26 and the pedal 10.

Figure 2:
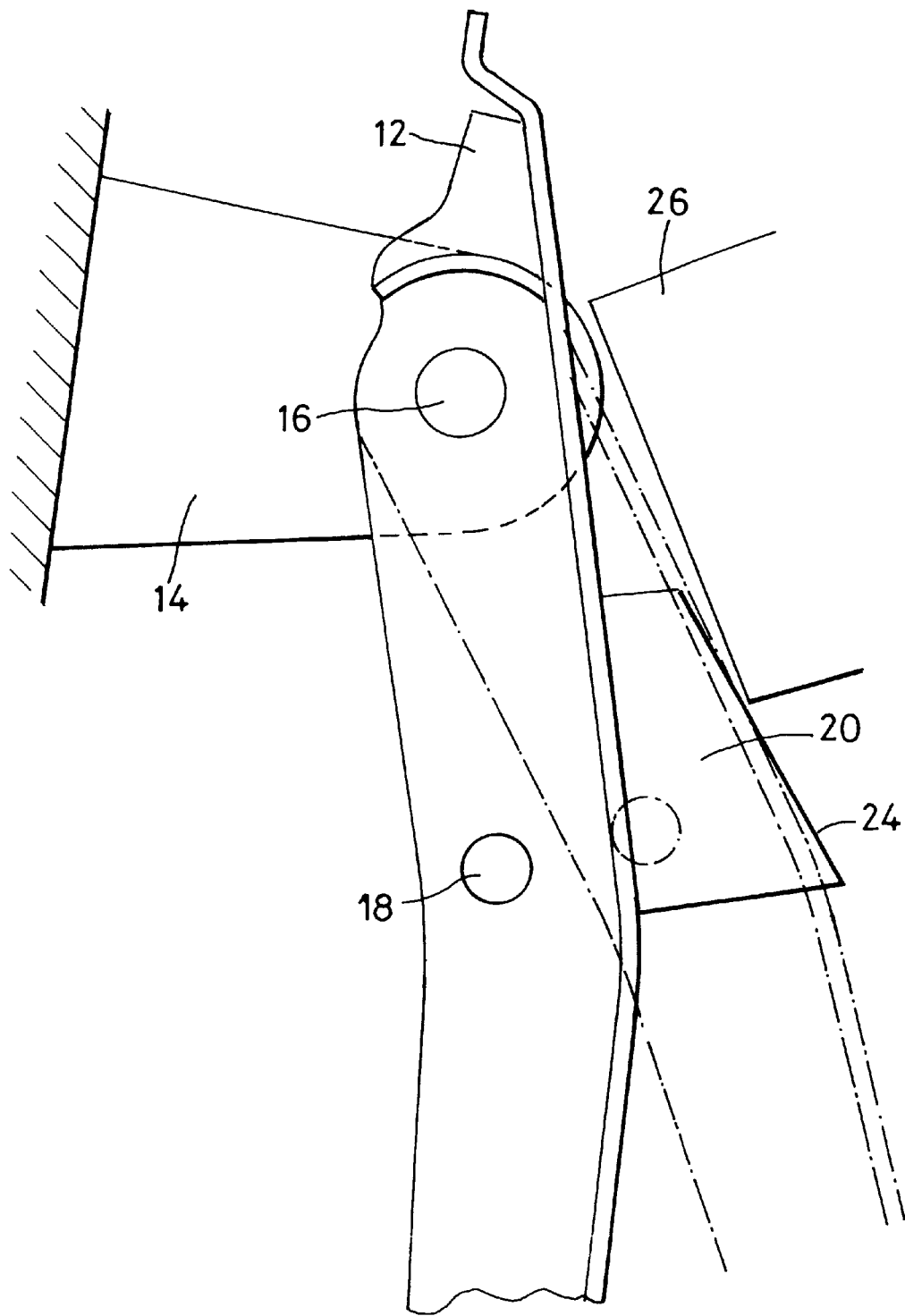
FIG. 2 is a side view of the pedal of FIG. 1 after a frontal impact

Referring to FIG. 2, if the vehicle is involved in a frontal impact of sufficient force, the fire wall, and with it the pedal mounting bracket 14 and therefore the pedal 10, are pushed rearwards into the passenger compartment towards the driver. This moves the upper end 12 of the pedal and the mounting pivot 16 rearwards towards the steering column bracket 26. As the pedal approaches the steering column bracket 26, after a certain amount of rearward travel of the bracket 14, the first part of it to hit the bracket 26, assuming that the pedal is fully released by the driver, is the deflecting block 20. Thereafter, as the mounting bracket 14, the upper end 12 of the pedal, and the mounting pivot 16 continue to move rearwards towards the steering column bracket 26, the deflecting block 20 is prevented from moving further, and causes the pedal to rotate away from the driver about the mounting pivot 16. The angle of the plane p, containing the rear surface 24 of the deflecting block 20 and the top end 12 of the pedal, to the front face 22 of the pedal is arranged to be equal to the full travel angle α of the pedal so that, when the top end 12 of the pedal hits the steering column bracket 26, the deflecting block has caused full depression of the pedal 10, thereby retracting it as far as possible in the forward direction away from the driver.

Figure 3:
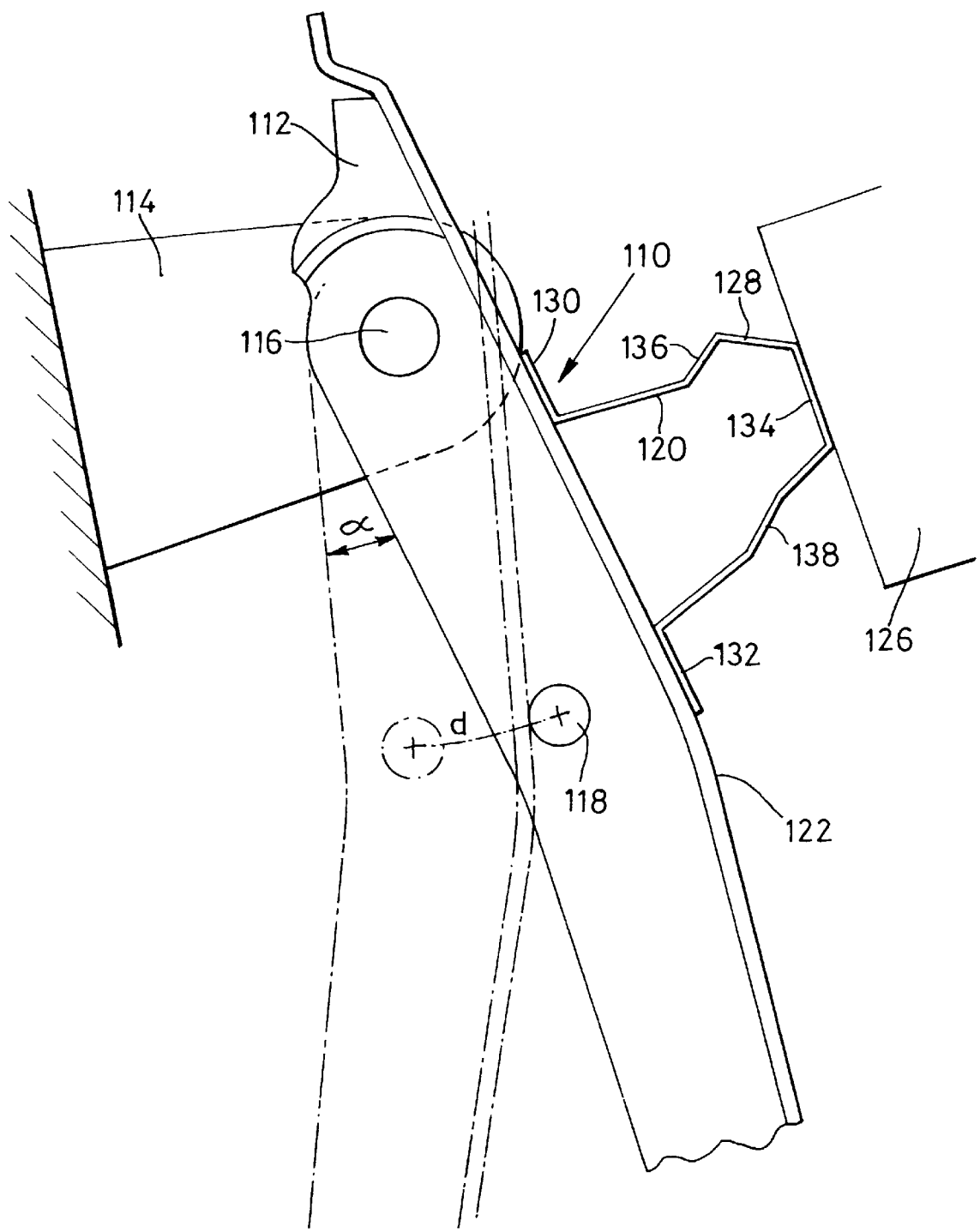
FIG. 3 is a side view of a brake pedal forming part of a vehicle according to a second embodiment of the invention.

In FIG. 3 a second embodiment is shown with features corresponding to those in FIG. 1 being indicated by the same reference numerals preceded by a 1. The only difference with the second embodiment is that the deflecting member comprises a deflecting bracket 120 formed from a bent metal strip 128. The two end portions 130, 132 of the strip 124 are fixed against the rear surface 122 of the pedal and a central portion 134 of it is supported in a position spaced from the rear surface 122 of the pedal so that it rests against, or just spaced from, the steering column mounting bracket 126, by two intermediate portions 136, 138. These intermediate portions 136, 138 are between the central portion 134 and the respective end portions 130, 132 and, when the pedal 110 is in its fully released position, bridge the gap between the pedal 110 and the steering column mounting bracket 136. The intermediate portions 136, 138 each have a number of bends therein to encourage and control collapse of the deflecting bracket.

Figure 4:
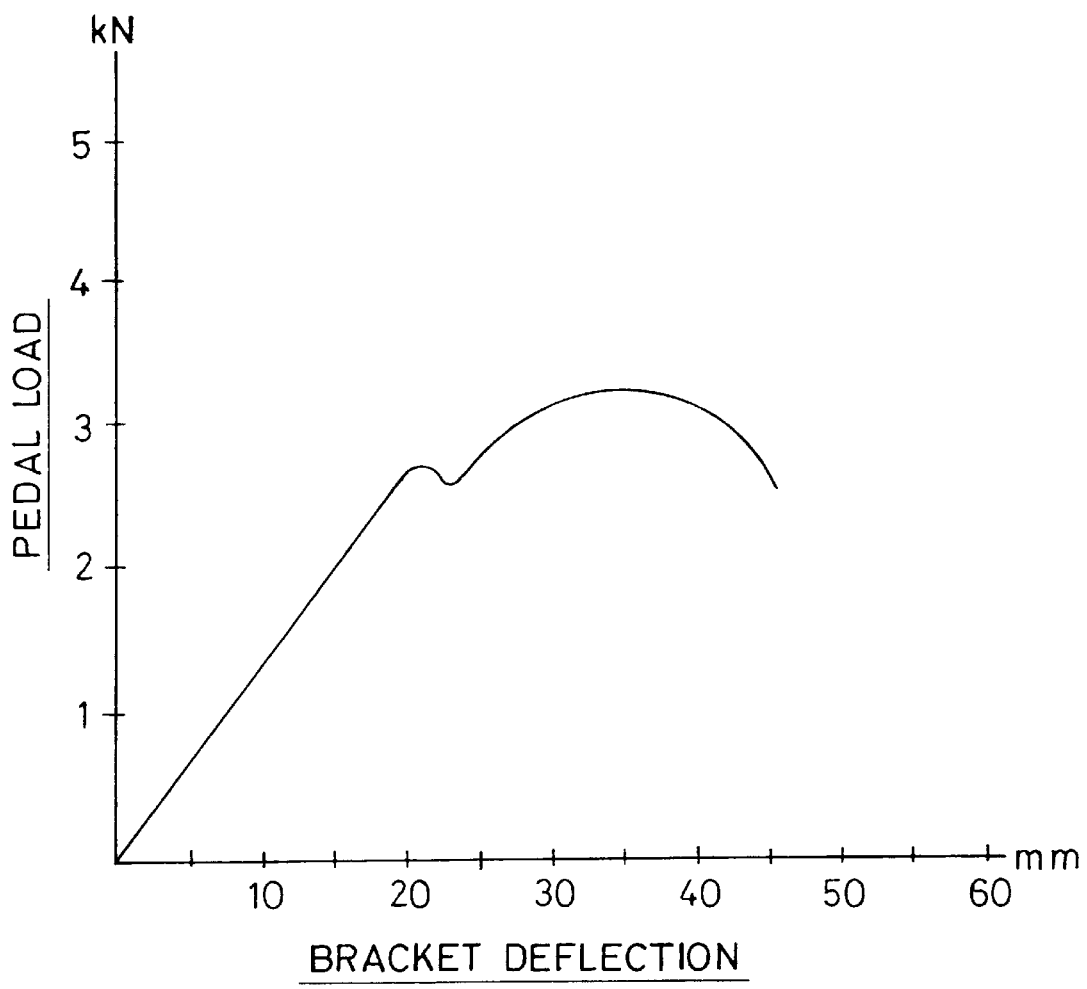
FIG. 4 is a graph showing the load applied to the brake pedal of FIG. 3 during impact.

With reference to FIG. 4, when the mounting bracket 114 starts to move rearwards under impact, the deflecting bracket 120 applies a forward force to the pedal which increases steadily until, at about 20 mm of movement, it applies a load sufficient to cause full depression of the brake pedal, which is about 3 kN. Under further travel the load stays approximately at this level, although it drops very slightly, then rises to another peak between 30 and 40 mm of movement and then falls off again gradually. The deflecting bracket 120 therefore holds the brake pedal in its fully depressed, or retracted, position during the final stages of the impact.

We claim:

1. A vehicle comprising a driver operated foot pedal having an upper end and a lower end adapted to be acted on by a driver's foot and a rear side facing rearwards of the vehicle, a mounting member, a pivot pivotably supporting said upper end on the mounting member, and a solid member positioned to the rear of the mounting member towards which the mounting member will tend to move on deformation of the vehicle on a frontal impact, wherein the pedal includes a deflecting member rigidly fixed relative to said lower end, and projecting rearwards from the rear side of the pedal below the pivot such that, if the mounting member is moved rearwards in the event of a frontal impact, the solid member will act on the deflecting member to causing at least partial depression of the pedal.

2. A vehicle according to claim 1 wherein the pedal is movable between a fully released position and a fully depressed position, and the deflecting member is, when the pedal is in a fully released position, spaced from the solid member so that it will only start to deflect the pedal after a certain amount of rearward movement of the mounting member.

3. A vehicle according to claim 2 wherein the deflecting member has a deflecting surface on its rear side arranged such that, if the upper end of the pedal in the region of the pivot engages the solid member, the pedal will be depressed by an amount approximately equal to its full travel in normal use.

4. A vehicle according to claim 1 wherein the deflecting member is deformable so that it can apply a load to the pedal which increases as the mounting member moves rearwards towards the solid member.

5. A vehicle according to claim 4 wherein the deflecting member is arranged so that the load it applies to the pedal is arranged to increase to a maximum level and then to remain substantially constant as the mounting member moves towards the solid member.

6. A vehicle according to claim 4 wherein the deflecting member is arranged so that the load it applies to the pedal is arranged to increase to a maximum level and then to decrease as the mounting member moves towards the solid member.

7. A vehicle according to claim 5 wherein the maximum value is of the order of 3 kN.

8. A vehicle according to claim 6 wherein the maximum value is of the order of 3 kN.

9. A vehicle according to claim 1 wherein the solid member comprises part of a steering column assembly.

10. A vehicle comprising a driver operated brake pedal having an upper end and a lower end adapted to be acted on by a driver's foot and a rear side facing rearwards of the vehicle, a mounting bracket, a pivot pivotably supporting said upper end on the mounting bracket, and a solid member positioned to the rear of the mounting bracket towards which the mounting bracket will tend to move on deformation of the vehicle on a frontal impact, wherein the pedal includes a deflecting block rigidly fixed relative to said lower end, and projecting rearwards from the rear side of the pedal below the pivot such that, if the mounting bracket is moved rearwards in the event of a frontal impact, the solid member will act on the deflecting block to causing at least partial depression of the pedal.

11. A vehicle according to claim 10 wherein the vehicle includes a steering assembly and the solid member comprises part of the steering assembly.

12. A vehicle according to claim 11 wherein the solid member comprises a steering column mounting bracket.

13. A vehicle comprising a driver operated brake pedal having an upper end and a lower end adapted to be acted on by a driver's foot and a rear side facing rearwards of the vehicle, a mounting bracket, a pivot pivotably supporting said upper end on the mounting bracket, and a solid member positioned to the rear of the mounting bracket towards which the mounting bracket will tend to move on deformation of the vehicle on a frontal impact, wherein the pedal includes a deflecting bracket rigidly fixed relative to said lower end, and projecting rearwards from the rear side of the pedal below the pivot such that, if the mounting bracket is moved rearwards in the event of a frontal impact, the solid member will act on the deflecting bracket to causing at least partial depression of the pedal.

14. A vehicle according to claim 13 wherein the deflecting bracket is formed from a single strip.

15. A vehicle according to claim 14 wherein the strip has two end portions each of which is fixed to the pedal, two intermediate portions, and a central portion supported by the intermediate portions so as to be spaced from the rear side of the pedal.

* * * * *